(12) United States Patent
Nakata et al.

(10) Patent No.: US 8,542,438 B2
(45) Date of Patent: Sep. 24, 2013

(54) LASER SCANNING MICROSCOPE HAVING A MICROELEMENT ARRAY

(75) Inventors: Tatsuo Nakata, Tokyo (JP); Kosuke Takagi, Saitama (JP)

(73) Assignee: Olympus Corporation, Tokyo (JP)

(*) Notice: Subject to any disclaimer, the term of this patent is extended or adjusted under 35 U.S.C. 154(b) by 223 days.

(21) Appl. No.: 12/948,937

(22) Filed: Nov. 18, 2010

(65) Prior Publication Data
US 2011/0121198 A1    May 26, 2011

(30) Foreign Application Priority Data
Nov. 25, 2009 (JP) ................................ 2009-267662

(51) Int. Cl.
*G02B 21/00* (2006.01)

(52) U.S. Cl.
USPC ........................................ 359/368; 250/458.1

(58) Field of Classification Search
None
See application file for complete search history.

(56) References Cited

U.S. PATENT DOCUMENTS

| | | | |
|---|---|---|---|
| 3,644,740 A * | 2/1972 | Dobratz et al. ........... | 250/214 R |
| 5,065,008 A | 11/1991 | Hakamata et al. | |
| 5,248,876 A | 9/1993 | Kerstens et al. | |
| 5,929,440 A * | 7/1999 | Fisher ....................... | 250/338.1 |
| 7,339,148 B2 | 3/2008 | Kawano et al. | |
| 7,511,812 B2 | 3/2009 | Van Beek et al. | |
| 2008/0156999 A1* | 7/2008 | Nishiwaki et al. ......... | 250/458.1 |
| 2010/0096560 A1* | 4/2010 | Imanishi et al. ........... | 250/458.1 |
| 2010/0282981 A1* | 11/2010 | Araya ........................ | 250/458.1 |

FOREIGN PATENT DOCUMENTS

| | | |
|---|---|---|
| EP | 1 431 795 A1 | 6/2004 |
| JP | 2000-097857 A | 4/2000 |
| JP | 2004-199063 A | 7/2004 |
| WO | WO 2006/000939 A1 | 1/2006 |

OTHER PUBLICATIONS

European Search Report dated Mar. 7, 2011 (in English) in counterpart European Application No. 10014801.

* cited by examiner

*Primary Examiner* — Arnel C Lavarias
*Assistant Examiner* — Jyotsna Dabbi
(74) *Attorney, Agent, or Firm* — Holtz, Holtz, Goodman & Chick, PC

(57) ABSTRACT

A laser scanning microscope includes a stage that moves a sample placed thereon, a laser light source that emits laser light, a line-focus optical system that focuses the laser light into a line shape, a DMD including a plurality of movable micromirrors that are arrayed in the lengthwise direction of the line shape and that reflect the line-focused laser light, an irradiation optical system that irradiates the sample with the laser light reflected by the DMD, and a photodetector in which a plurality of channels for detecting light from the sample are arrayed in one column, wherein the DMD is driven so that a plurality of micromirrors simultaneously reflect the laser light and so that micromirrors that reflect the laser light are sequentially switched, wherein the stage moves the sample in a direction crossing the array direction of a plurality of light spots formed on the sample.

5 Claims, 8 Drawing Sheets

LASER SCANNING MICROSCOPE HAVING A MICROELEMENT ARRAY

BACKGROUND OF THE INVENTION

1. Field of the Invention

The present invention relates to laser scanning microscopes.

This application is based on Japanese Patent Application No. 2009-267662, the content of which is incorporated herein by reference.

2. Description of Related Art

In a type of conventionally known cytometer, laser light from a laser light source is scanned two-dimensionally over a sample to perform measurements on cells (e.g., see Japanese Unexamined Patent Application, Publication No. 2000-97857).

Also known is a type of laser scanning microscope that includes a light source for irradiating a sample with laser light and a photodetector for detecting fluorescence from the sample and in which a digital micromirror device (hereinafter abbreviated as "DMD"), including a plurality of micromirrors, and a galvanometer mirror are provided between the light source and the photodetector (e.g., see Japanese Unexamined Patent Application, Publication No. 2004-199063).

BRIEF SUMMARY OF THE INVENTION

It is an object of the present invention to provide a laser scanning microscope with which it is possible to reduce the time required for scanning and to detect light from a sample with high sensitivity.

In order to achieve the above object, the present invention employs the following solutions.

The present invention provides a laser scanning microscope including a stage that moves a sample placed thereon; a laser light source that emits laser light; a line-focus optical system that focuses the laser light from the laser light source into a line shape; a microelement array having a plurality of microelements that are arrayed in a lengthwise direction of the line and that reflect or transmit the laser light focused into the line shape by the line-focus optical system, respectively; an irradiation optical system that irradiates the sample with the laser light reflected or transmitted by the microelement array; and a photodetector that is disposed at a position conjugate with the microelement array and in which a plurality of channels that detect light from the sample are arrayed in one column, wherein the microelement array is driven so that laser light is reflected or transmitted simultaneously by a plurality of microelements disposed at intervals on one straight line and so that the microelements that reflect or transmit the laser light are switched sequentially, and wherein the stage moves the sample in a direction crossing an array direction of a plurality of light spots formed on the sample.

According to the present invention, laser light emitted from the laser light source is focused into a line shape by the line-focus optical system, is reflected or transmitted by the microelement array, and is then radiated by the irradiation optical system onto a sample in the form of light spots. Thus, light from the sample, for example, fluorescence generated by excitation of a fluorescent material existing in the sample, is detected by the photodetector.

At this time, the microelement array is driven so that laser light is reflected or transmitted simultaneously by a plurality of microelements disposed on one straight line at intervals and so that the microelements that reflect or transmit the laser light are switched sequentially. Thus, the plurality of light spots formed on the sample are moved along the array direction of the light spots. Furthermore, by moving the stage, the plurality of light spots formed on the sample are moved in a direction crossing the array direction of the light spots. Accordingly, it is possible to scan the laser light two-dimensionally over the sample. By simultaneously performing the above operation with the plurality of light spots, it is possible to perform two-dimensional scanning at high speed, which serves to reduce the time required for scanning.

Furthermore, for the photodetector, by using a photodetector in which a plurality of channels are arrayed in one column, for example, a 32-channel photomultiplier tube (PMT), it is possible to detect light from the sample with good sensitivity, thereby acquiring precise images based on the light detected.

In the above invention, the plurality of channels of the photodetector may be arrayed in one column at a pitch greater than the pitch of the microelements of the microelement array, and the laser scanning microscope may further include a controller that controls the microelement array to cause light reflected or transmitted by different microelements to enter the individual channels and to sequentially switch the microelements that reflect or transmit the light to enter the channels so that light from different points on the sample enters each of the channels.

By controlling the microelement array with the controller as described above, light reflected or transmitted by different microelements enters the individual channels of the photodetector. Thus, it is possible to detect light from different points on the sample via the individual channels. Furthermore, by sequentially switching the microelements that reflect or transmit light to enter the channels so that light from different points on the sample enters each of the channels, it is possible to sequentially move the points on the sample detected by the channels. Furthermore, by arranging the detection results according to the positional relationship identified based on the microelement array and the stage, it is possible to improve the image resolution. That is, according to the present invention, it is possible to acquire images with a high resolution even in a case where a photodetector with a low resolution is used.

In the above invention, the laser scanning microscope may further include cylindrical lenses that focus light from the sample into the individual channels of the photodetector.

With the cylindrical lenses, light coming from the sample and directed toward a channel boundary of the photodetector can be focused so that the light is directed toward the center of one of the channels. Thus, the light from the sample can be made to enter the individual channels of the photodetector more reliably. Accordingly, it is possible to improve the precision of images acquired by the photodetector.

In the above invention, the laser scanning microscope may further include a sensitivity adjusting unit for adjusting sensitivities of the individual channels of the photodetector.

With the sensitivity adjusting unit, it is possible to adjust the sensitivity for detecting light from the sample with each of the channels of the photodetector. Accordingly, it is possible to improve the precision of images acquired by the photodetector.

In the above invention, the stage may be linearly driven continuously at a constant velocity, and the controller may sequentially switch the microelements that reflect or transmit the light to enter the individual channels at a predetermined cycle in a direction inclined relative to the lengthwise direction.

In the case where the stage is moved continuously, light spots formed on the sample become shifted in the moving direction of the stage if the microelements are merely switched in the lengthwise direction of the line. Thus, it is not possible to illuminate an area on the sample on one straight line with a plurality of light spots.

Thus, by controlling the microelement array so that switching is performed not only in the lengthwise direction of the line but also in a direction crossing the lengthwise direction, it is possible to cancel out the deviation due to the movement of the stage so that an area along one straight line is illuminated with a large number of light spots formed on the sample. Furthermore, by repeatedly driving the plurality of microelements that are sequentially switched on, it is possible to move the linear illuminating area in a direction crossing the lengthwise direction, thereby acquiring a two-dimensional image. In this case, since the stage is moved continuously even during switching of the microelements, it is possible to acquire an image efficiently.

In the above invention, of the plurality of microelements that are disposed at intervals on one straight light and that reflect or transmit the laser light simultaneously, mutually adjacent microelements may be disposed on columns adjacent to each other in a direction perpendicular to the lengthwise direction.

Accordingly, it is possible to radiate the laser light densely on the sample with the plurality of light spots formed on the sample. Thus, it is possible to improve the resolution of two-dimensional images, thereby acquiring sharp images.

According to the present invention, an advantage is afforded in that the time required for scanning is reduced and light from a sample can be detected with high sensitivity.

DETAILED DESCRIPTION OF THE INVENTION

First Embodiment

A laser scanning microscope 100 according to a first embodiment of the present invention will be described below with reference to the drawings.

Figure 1:
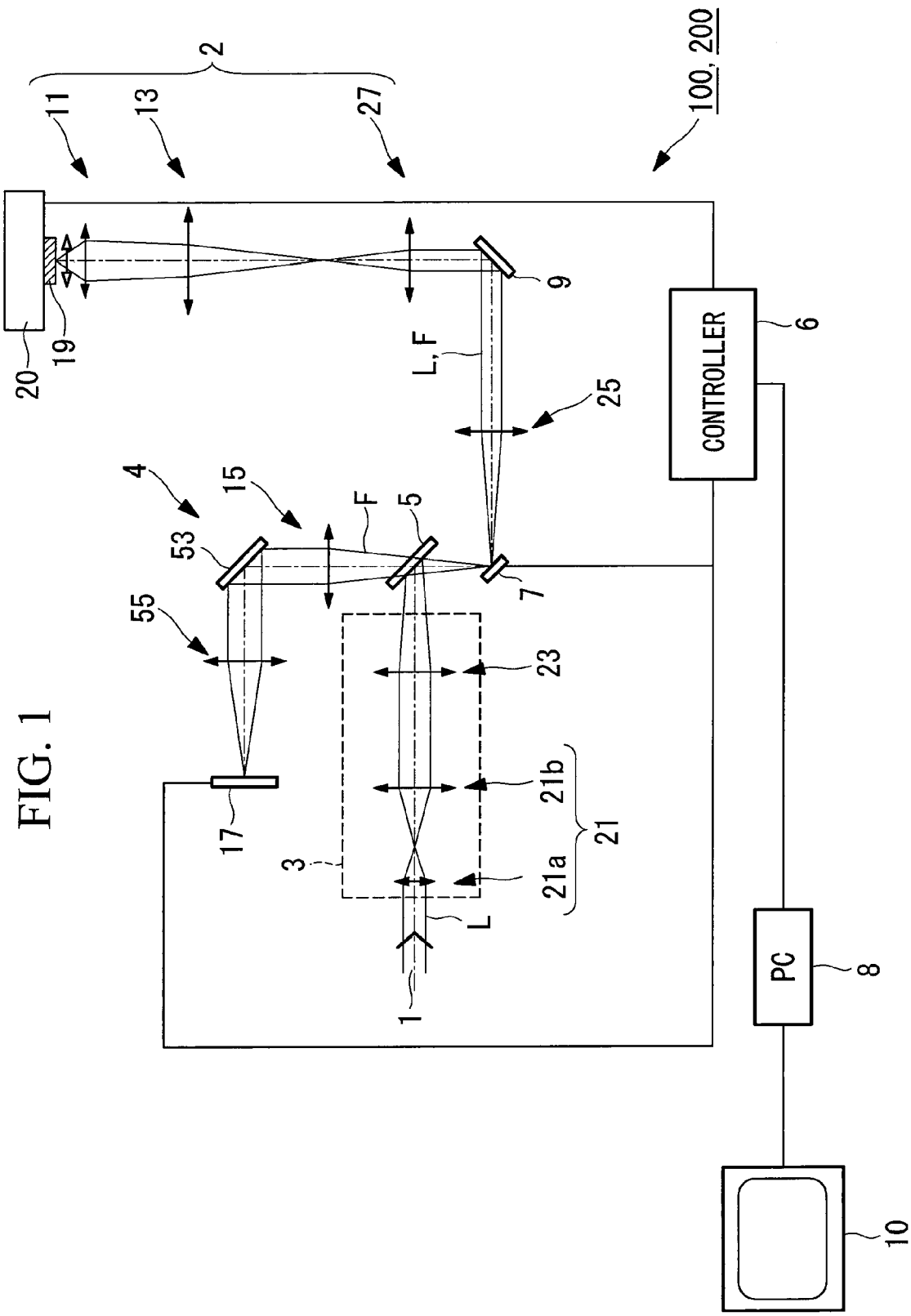
FIG. 1 is a diagram schematically showing the configuration of laser scanning microscopes according to embodiments of the present invention.

As shown in FIG. 1, the laser scanning microscope 100 according to this embodiment includes a stage 20 that moves a sample 19 placed thereon, a laser light source 1 that emits laser light L, a line-focus optical system 3 that focuses the laser light L from the laser light source 1 into a line shape, a DMD (microelement array) 7 that selectively reflects the laser light L focused by the line-focus optical system 3, an irradiation optical system 2 that irradiates the sample 19 with the laser light L reflected by the DMD 7, an excitation dichroic mirror 5 that branches fluorescence F generated at the sample 19 from the light path of the laser light L, a detection optical system 4 that detects the fluorescence F branched by the excitation dichroic mirror 5, and a controller 6 that controls these components.

The line-focus optical system 3 includes a beam expander 21 that adjusts the diameter of the beam of the laser light L by changing the distance between a lens 21a and a lens 21b and a cylindrical lens 23 that changes the cross section of the laser light L from a substantially circular shape into a line shape. With these components, the line-focus optical system 3 is configured to focus the laser light L from the laser light source 1 into a line shape at the DMD 7.

The excitation dichroic mirror 5 is configured to reflect the laser light L from the line-focus optical system 3 toward the DMD 7 and to transmit the fluorescence F generated at the sample 19. Having such characteristics, the excitation dichroic mirror 5 branches the fluorescence F generated at the sample 19 and returned via the irradiation optical system 2, a mirror 9, and the DMD 7 from the light path of the laser light L.

The DMD 7 includes a plurality of movable micromirrors (microelements) (not shown). The movable micromirrors are arrayed in the lengthwise direction of the line of the laser light L focused into the line shape by the line-focus optical system 3. Being thus configured, by turning the movable micromirrors on and off, the DMD 7 selectively reflects a part of the laser light L focused by the line-focus optical system 3 toward the mirror 9. Thus, as shown in FIG. 2, the part of the laser light L is shone on the sample 19 in the form of a plurality of spots of light (black circles in FIG. 2) with intervals provided therebetween in the array direction of the spots of light (X direction).

Furthermore, the DMD 7 is disposed at a position conjugate with the sample 19 so that an image of the sample 19 is formed on the DMD 7.

Figure 2:
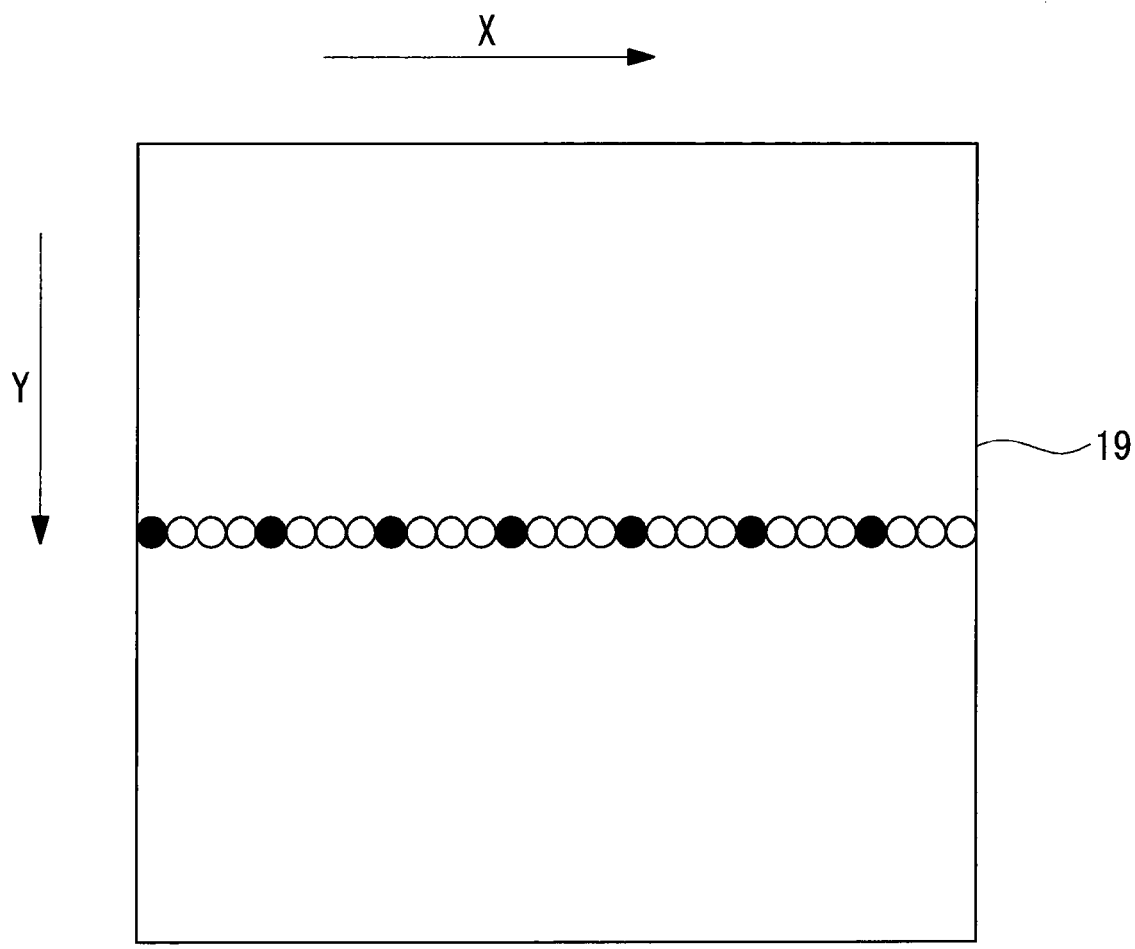
FIG. 2 is a diagram showing spot positions of laser light on a sample.

The stage 20 is, for example, an electrically operated stage that is driven by a motor and is configured to move the sample 19 in the direction (Y direction) perpendicular to the array direction of the spots of light, as shown in FIG. 2. Thus, it is possible to scan the line-focused laser light L reflected by the DMD 7 over the sample 19 in the direction (Y direction) perpendicular to the array direction of the spots of light.

A relay lens 25 that relays the laser light L reflected by the DMD 7 is provided Between the DMD 7 and the mirror 9.

The irradiation optical system 2 includes a pupil projection lens 27, an image forming lens 13, and an objective lens 11. With these components, the irradiation optical system 2 is configured to focus the laser light L selectively reflected by the DMD 7 onto the sample 19 and to focus the fluorescence F generated at the sample 19.

The detection optical system 4 includes two relay lenses 15 and 55 that relay the fluorescence F transmitted through the excitation dichroic mirror 5, a mirror 53 that is disposed between the relay lens 15 and the relay lens 55 and that reflects the fluorescence F transmitted through the excitation dichroic mirror 5 toward a photodetector 17, and the photodetector 17 that detects the fluorescence F reflected by the mirror 53.

Figure 3:
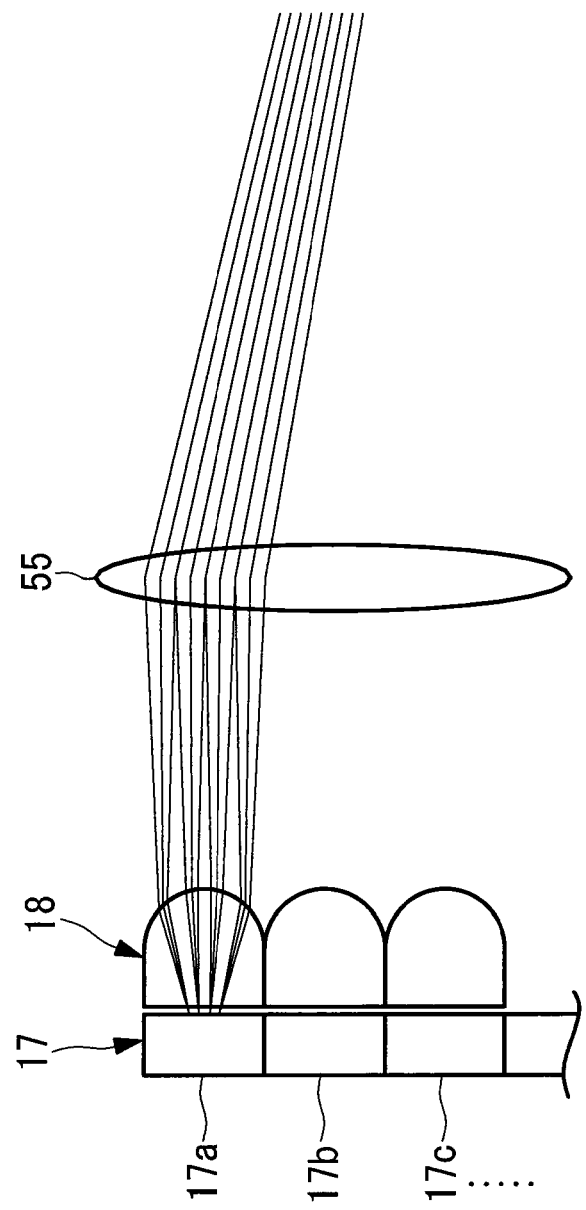
FIG. 3 is a partial enlarged view of a photodetector in FIG. 1.

For example, the photodetector 17 is a 32-channel photomultiplier tube, in which a plurality of channels (reference signs 17a, 17b, 17c, ...) for detecting light from the sample 19 are arrayed in one column, as shown in FIG. 3. The plurality of channels are arrayed at a pitch that is greater than the pitch of the movable micromirrors of the DMD 7. The photodetector 17 is disposed at a position conjugate with the DMD 7.

Furthermore, cylindrical lenses 18 that focus the fluorescence F into the individual channels of the photodetector 17 are provided between the photodetector 17 and the relay lens 55.

With the cylindrical lenses 18, the fluorescence F coming from the sample 19 and directed toward a channel boundary of the photodetector 17 can be focused so that the fluorescence F is directed toward the center of one of the channels. Thus, the fluorescence F from the sample 19 can be made to enter the individual channels of the photodetector 17 more reliably.

The controller 6 controls the DMD 7, the stage 20, and the photodetector 17 so that these components are synchronized with each other. Specifically, the controller 6 controls the DMD 7 so that light reflected by different movable micromirrors individually enters the channels of the photodetector 17. Furthermore, the controller 6 controls the DMD 7 so that the movable micromirrors that reflect light to enter the channels are switched sequentially. Furthermore, after sequentially switching on all the movable micromirrors arrayed in one column, the controller 6 operates the stage 20 so that the sample 19 is moved by one column in the direction perpendicular to the array direction of the spots of light.

By performing control as described above, it is possible to detect the fluorescence F from different points on the sample 19 via the individual channels of the photodetector 17 and to sequentially move the points on the sample 19 to be detected via the individual channels.

Furthermore, the controller 6 is connected to a personal computer (hereinafter abbreviated as "PC") 8 that generates a fluorescence image based on luminance data of the fluorescence F detected by the photodetector 17. Furthermore, the PC 8 is connected to a monitor 10 that displays the fluorescence image generated by the PC 8.

The operation of the thus-configured laser scanning microscope 100 will be described below.

In the laser scanning microscope 100 according to this embodiment, the diameter of the beam of the laser light L emitted from the laser light source 1 is adjusted by the beam expander 21. Then, the laser light L is transmitted through the cylindrical lens 23, thereby being focused into a line shape, and is reflected toward the DMD 7 by the excitation dichroic mirror 5.

The laser light L reflected by the excitation dichroic mirror 5 forms an image on the DMD 7 in a line shape extending in the array direction (X direction) of the movable micromirrors. Of the laser light L forming the image on the DMD 7, only the portion of the laser light L reflected by the movable micromirrors of the DMD 7 that are ON is reflected toward the mirror 9 as spots of light (black circles in FIG. 2).

The laser light L reflected by the DMD 7 is relayed by the relay lens 25, is deflected by the mirror 9, and is focused at a focal point on the sample 19 by the objective lens 11 via the pupil projection lens 27 and the image forming lens 13.

At the focal point on the sample 19, a fluorescent material in the sample 19 is excited, whereby fluorescence F is generated. The fluorescence F is focused by the objective lens 11 and then enters the DMD 7 via the image forming lens 13, the pupil projection lens 27, the mirror 9, and the relay lens 25.

The fluorescence F that has entered the DMD 7 is reflected toward the excitation dichroic mirror 5 by movable micromirrors of the DMD 7 that are ON and is transmitted through the excitation dichroic mirror 5 and thereby branched from the light path of the laser light L. At this time, each of the movable micromirrors, having a sufficiently small area, functions as a confocal pinhole, so that only the fluorescence F from the focal point of the objective lens 11 on the sample 19 is reflected toward the excitation dichroic mirror 5, whereas fluorescence that occurs in the periphery of the focal point is blocked so as not to enter the detection optical system 4.

Then, the fluorescence F transmitted through the excitation dichroic mirror 5 is detected by the photodetector 17 via the relay lenses 15 and 55 and the mirror 53.

Figure 4:
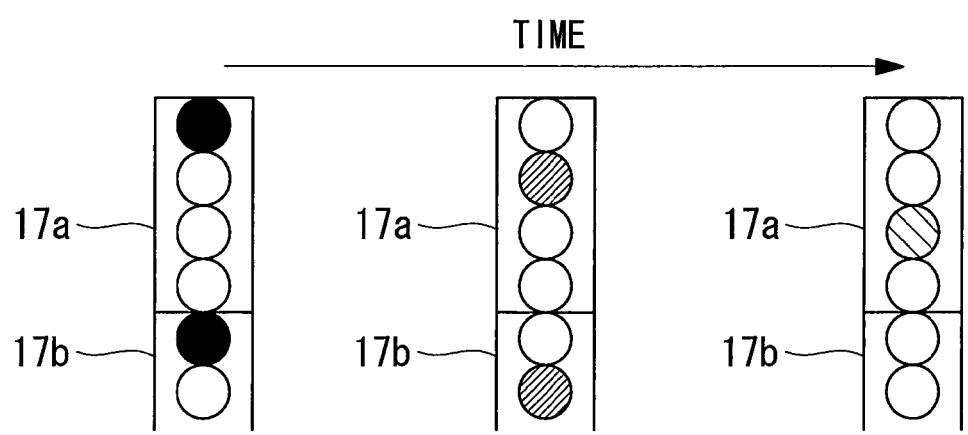
FIG. 4 is a diagram showing spots of light that enter the photodetector in FIG. 1.

In the operation described above, the ON/OFF states of the movable micromirrors of the DMD 7 are switched according to instructions from the controller 6, as shown in FIG. 4, whereby the fluorescence F that enters the individual channels of the photodetector 17 is switched. Here, a description will be given in the context of an example where four spots of light of the laser light L enter each of the channels of the photodetector 17.

Of the movable micromirrors arrayed in the DMD 7, every fourth movable micromirror in the lengthwise direction of the line is switched on, whereas the other movable micromirrors are switched off.

Figure 5B:
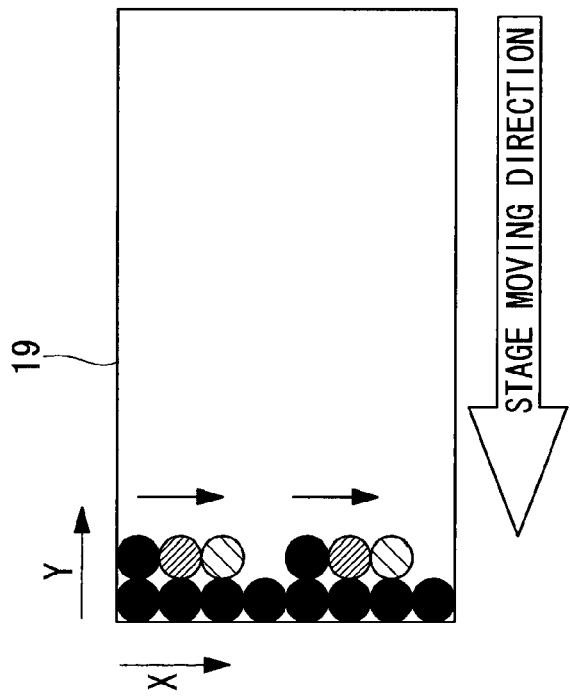
FIG. 5B is a diagram showing the positions of spots of light on the sample in a case where the spots of light enter the second column.
Figure 5A:
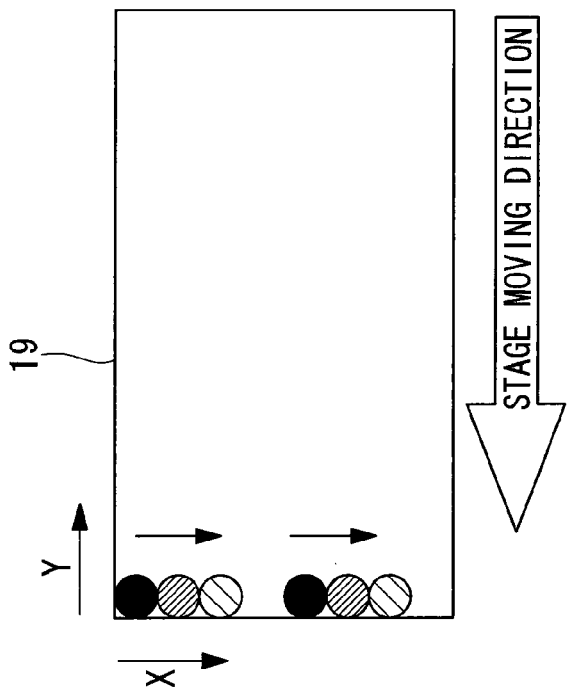
FIG. 5A is a diagram showing the positions of spots of light on a sample in a case where the spots of light enter the first column.

Then, after all the four movable micromirrors allocated to each channel of the photodetector 17 are sequentially switched on, i.e., after the sample 19 is entirely irradiated with spots of light of the laser light L along the array direction (X direction) of the spots light, the stage 20 moves the sample 19 by one column in the direction (Y direction) perpendicular to the array direction of the spots of light, as shown in FIGS. 5A and 5B.

By driving the DMD 7 in this manner and moving the stage 20 intermittently, it is possible to irradiate the entire observation area of the sample 19 completely with the laser light L and to detect the fluorescence F from the irradiation points with the photodetector 17. Note that the active spots of light of the fluorescence F need not necessarily be shifted one-by-one to adjacent spot positions, as in the example shown in FIG. 4: they may be shifted to, for example, every other spot position.

The luminance data of the fluorescence F detected as described above is sent to the PC 8 via the controller 6. The PC 8 arranges the luminance data of the fluorescence F detected by the photodetector 17 according to the positional relationship identified based on the stage 20 and the DMD 7, thereby generating a fluorescence image. The fluorescence image thus generated is displayed on the monitor 10.

As described above, in the laser scanning microscope 100 according to this embodiment, the DMD 7 is driven so that a plurality of movable micromirrors disposed at intervals on one straight line simultaneously reflect the laser light L and so that the movable micromirrors that reflect the laser light L are switched sequentially. Thus, the light spots of the laser light L formed on the sample 19 move along the array direction of the light spots. Furthermore, by moving the stage 20, the light spots of the laser light L formed on the sample 19 move in the direction perpendicular to the array direction of the light spots. Accordingly, it is possible to scan the laser light L two-dimensionally over the sample 19. By performing the above operation simultaneously with a plurality of light spots of the laser light L, it is possible to perform two-dimensional scanning at high speed, which serves to reduce the time required for scanning.

Furthermore, by using a 32-channel photomultiplier tube (PMT) as the photodetector 17, it is possible to detect the fluorescence F with good sensitivity. Thus, it is possible to acquire an image with high precision based on the fluorescence F detected.

Alternatively, as the photodetector 17, a plurality of 32-channel PMTS may be arrayed in the array direction of the light spots of the fluorescence F. Accordingly, it is possible to improve the quality of the image acquired.

Furthermore, in the laser scanning microscope 100 according to this embodiment, the controller 6 controls the DMD 7 to sequentially switch the movable micromirrors that reflect light to enter the channels so that light reflected by different movable micromirrors enters the individual channels and so that light from different points on the sample 19 enters each of the channels.

By controlling the DMD 7 in this manner, light reflected by different movable micromirrors enters the individual channels of the photodetector 17. Thus, it is possible to detect light from different points on the sample 19 with the individual channels. Furthermore, by sequentially switching the movable micromirrors that reflect light to enter the individual channels so that light from different points on the sample 19 enters each of the channels, it is possible to sequentially move the points on the sample 19 that are detected with the individual channels. Furthermore, by arranging the detection results according to the positional relationship identified based on the DMD 7 and the stage 20, it is possible to improve the image resolution. That is, with the laser scanning microscope 100 according to this embodiment, it is possible to acquire an image having a high resolution even in a case where the photodetector 17 used has a low resolution.

The laser scanning microscope 100 according to this embodiment may include a sensitivity adjusting unit for adjusting the sensitivity of each of the channels of the photodetector 17.

With the sensitivity adjusting unit, it is possible to adjust the sensitivity for detecting the fluorescence F with each of the channels of the photodetector 17. Accordingly, it is possible to improve the precision of images acquired by the photodetector 17.

Second Embodiment

Next, a laser scanning microscope 200 according to a second embodiment of the present invention will be described with reference to the drawings. In the description of this embodiment, commonalities with the laser scanning microscope 100 according to the first embodiment will be omitted, and the description will be directed mainly to differences.

The laser scanning microscope 200 according to this embodiment differs from the laser scanning microscope 100 according to the first embodiment in that the stage 20 is moved continuously, not intermittently.

Figure 6:
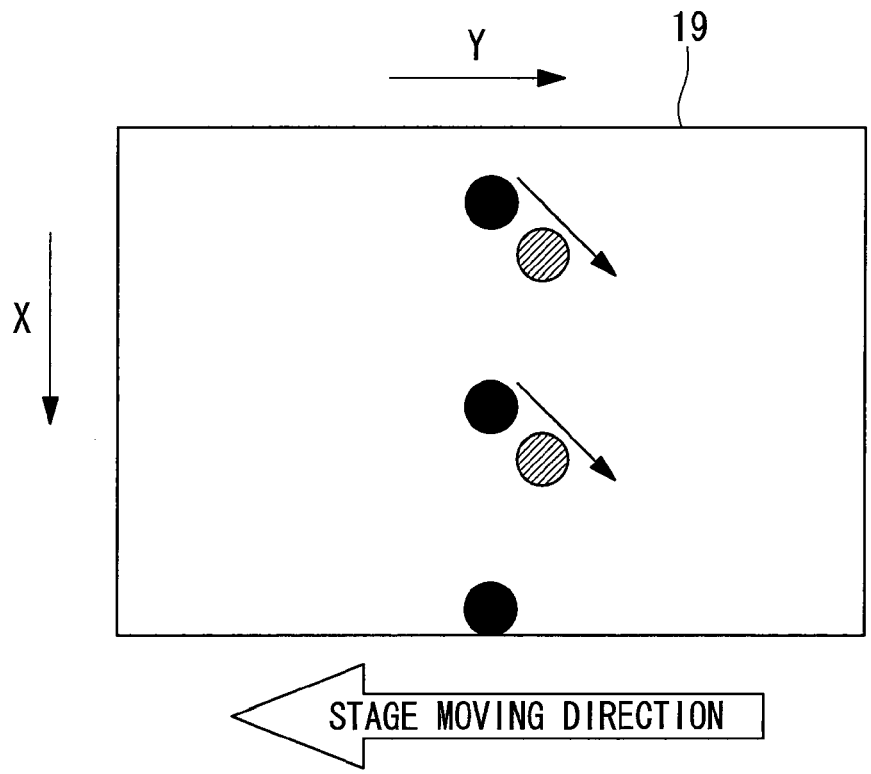
FIG. 6 is a diagram showing the positions of spots of light on the sample in a case where a stage is moved continuously.

As shown in FIG. 6, in the case where the stage 20 is moved continuously, light spots of the laser light L formed on the sample 19 become shifted in the moving direction (Y direction) of the stage 20 if the movable micromirrors are merely switched in the lengthwise direction of the line. Thus, it is not possible to illuminate an area on the sample 19 on one straight line with a plurality of light spots.

Figure 7A:
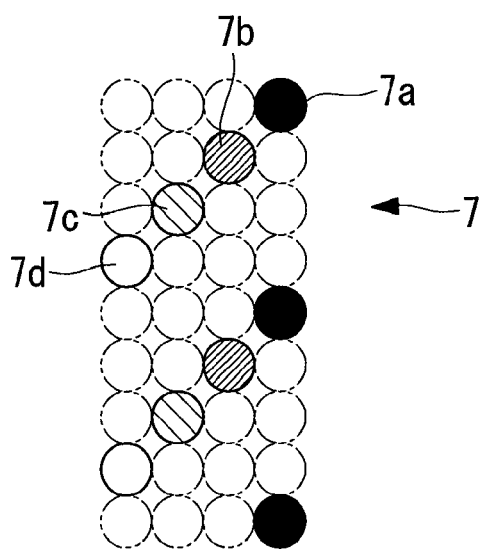
FIG. 7A is a diagram showing the operation of a laser scanning microscope according to a second embodiment, in relation to spots of light on a DMD.

Thus, in the laser scanning microscope 200 according to this embodiment, the controller 6 sequentially switches the movable micromirrors that reflect light to enter the channels of the photodetector 17 at a predetermined cycle in a direction inclined relative to the lengthwise direction, as shown in FIG. 7A. Specifically, in the example shown in FIG. 7A, the movable micromirrors that reflect the laser light L are switched in the order 7a, 7b, 7c, and 7d.

Figure 7B:
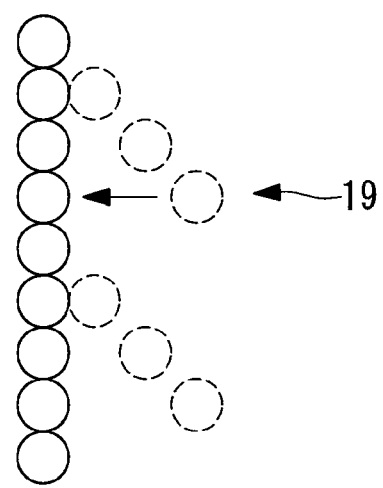
FIG. 7B is a diagram showing the operation of the laser scanning microscope according to the second embodiment, in relation to spots of light on a sample.

By controlling the DMD 7 so that switching is performed not only in the lengthwise direction of the line but also in a direction crossing the lengthwise direction, as described above, it is possible to cancel out the deviation due to the movement of the stage 20 so that an area along one straight line is illuminated with a large number of light spots formed on the sample 19, as shown in FIG. 7B. Furthermore, by repeatedly driving the plurality of movable micromirrors that are sequentially switched on, it is possible to move the linear illuminating area in a direction crossing the lengthwise direction, thereby acquiring a two-dimensional image. In this case, since the stage 20 is moved continuously even during switching of the movable micromirrors, it is possible to acquire an image efficiently.

First Modification

Figure 8A:
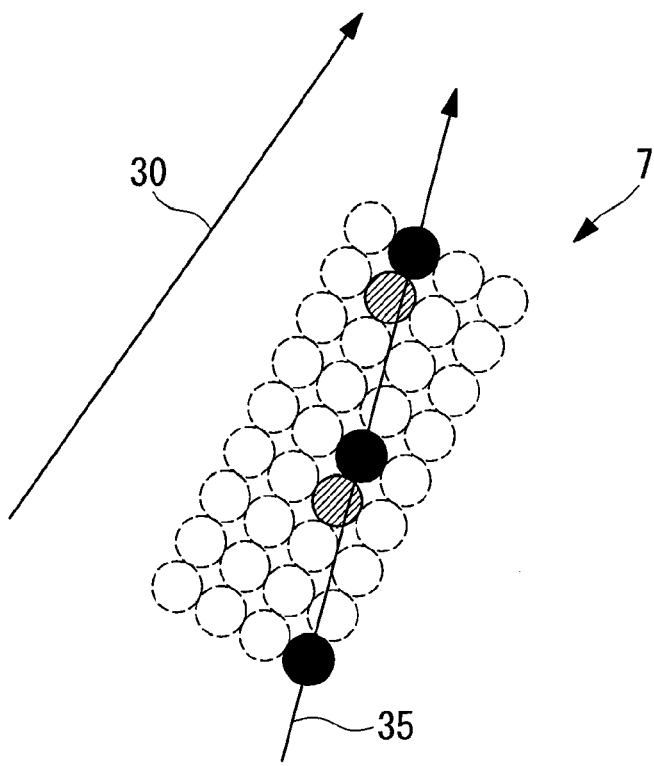
FIG. 8A is a diagram showing the operation of a laser scanning microscope according to a first modification, in relation to spots of light on a DMD.
Figure 8B:
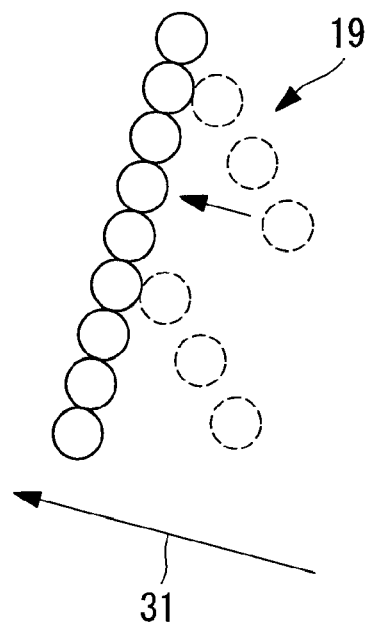
FIG. 8B is a diagram showing the operation of the laser scanning microscope according to the first modification, in relation to spots of light on a sample.

As a first modification of the laser scanning microscope 200 according to the second embodiment, the movable micromirrors of the DMD 7 may be arrayed in a direction inclined with respect to the laser light L line-focused by the line-focus optical system 3 (the direction indicated by an arrow 30), as shown in FIG. 8A. In this case, the stage 20 is moved continuously in the direction (the direction indicated by an arrow 31) perpendicular to the array direction (the direction indicated by an arrow 35) of the microelements that reflect the laser light L simultaneously.

In the laser scanning microscope 200 according to the second embodiment, the DMD 7 must be irradiated with the laser light L with a width corresponding to four columns of movable micromirrors. In contrast, with the laser scanning microscope according to this modification, it is possible to narrow the area irradiated with the laser light L to a width corresponding to two columns of movable micromirrors. Accordingly, it is possible to increase the laser irradiation power per unit area.

Furthermore, it is possible to increase the image resolution in the stage moving direction compared with the laser scanning microscope 200 according to the second embodiment. Furthermore, in contrast to the laser scanning microscope 200 according to the second embodiment, with which the resolution in the Y direction becomes lower than the resolution in the X direction, with the laser scanning microscope according to this modification, it is possible to achieve the same resolution in the X and Y directions.

The moving velocity (Vx, Vy) of the stage 20 is determined in the following manner.

Figure 9A:
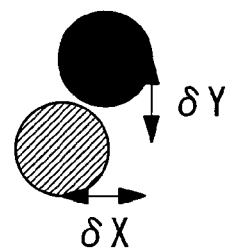
FIG. 9A is a diagram showing a method of determining the stage moving velocity in the case of FIG. 8A, in relation to spots of light on a DMD.
Figure 9B:
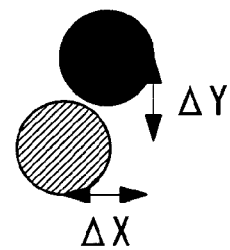
FIG. 9B is a diagram showing a method of determining the stage moving velocity in the case of FIG. 8A, in relation to spots of light on a sample.

As shown in FIGS. 9A and 9B, letting one sampling pixel interval on the sample 19 in the X direction and Y direction be denoted by ΔXs and ΔYs, respectively, ΔXs and ΔYs are expressed as in equations (1) and (2) below, respectively:

$$\Delta Xs = CX \times \delta X - \Delta t \times Vx \quad (1)$$

$$\Delta Ys = CY \times \delta Y - \Delta t \times Vy \quad (2)$$

In the above equations, CX and CY denote constants that are determined according to the optical design, δX and δY denote constants that are determined according to the structure of the DMD 7 (the array pitch of the movable micromirrors), and Δt and ΔT denote switching times of the movable micromirrors of the DMD 7.

The stage velocity (Vx, Vy) is determined based on the above equations so that the non-deviation condition expressed in equation (3) below is satisfied:

$$CY \times \delta Y - \Delta t \times Vy = 0 \quad (3)$$

Second Modification

Figure 10A:
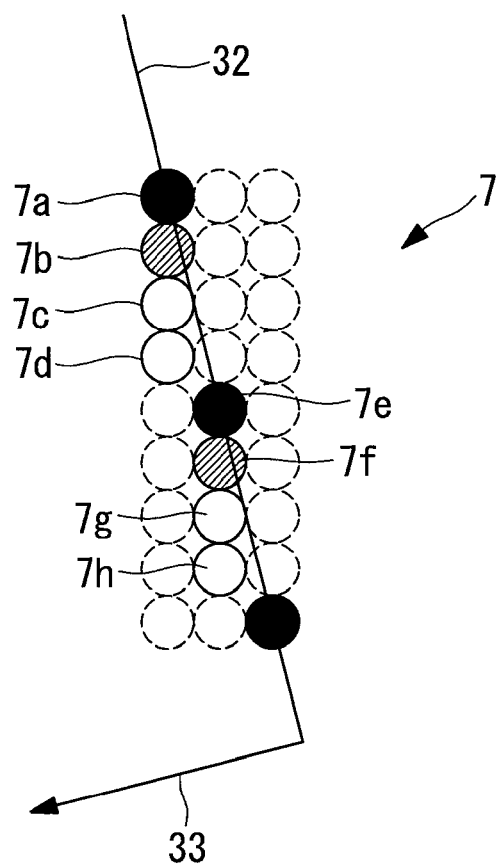
FIG. 10A is a diagram showing the operation of a laser scanning microscope according to a second modification, in relation to spots of light on a DMD.

As a second modification of the laser scanning microscope 200 according to the second embodiment, the arrangement may be such that, as shown in FIG. 10A, of a plurality of movable micromirrors that are disposed at intervals in one straight line (straight line 32) and that reflect the laser light L simultaneously, mutually adjacent microelements are disposed on columns adjacent in the direction perpendicular to the lengthwise direction of the line and such that the stage 20 is moved in the direction perpendicular to the straight line 32.

Specifically, in the example shown in FIG. 10A, a movable micromirror set including movable micromirrors 7a, 7b, 7c, and 7d and a movable micromirror set including movable micromirrors 7e, 7f, 7g, and 7h are disposed adjacent to each other in the direction perpendicular to the lengthwise direction of the line. Furthermore, the laser light L is reflected simultaneously by the corresponding movable micromirrors in these movable micromirror sets, for example, the movable micromirror 7a and the movable micromirror 7e. The stage 20 is moved in the direction (the direction indicated by an arrow 33) perpendicular to the straight line 32 passing through the movable micromirror 7a and the movable micromirror 7e. This operation is repeated with all the movable micromirrors in the movable micromirror sets.

Figure 10B:
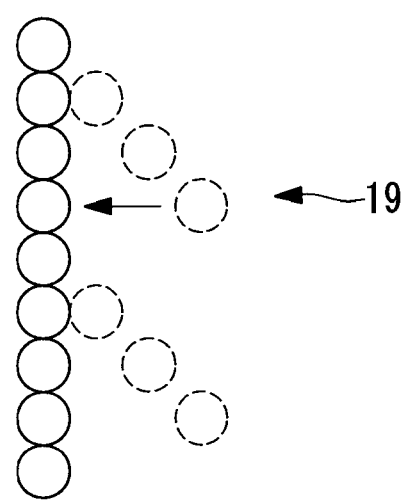
FIG. 10B is a diagram showing the operation of the laser scanning microscope according to the second modification, in relation to spots of light on a sample.

Accordingly, as shown in FIG. 10B, it is possible to cancel out deviation due to the movement of the stage 20 so that an area along one straight line is illuminated with a large number of light spots formed on the sample 19. In this case, it is possible to radiate the laser light L densely on the sample 19 with the plurality of light spots formed on the sample 19. Thus, it is possible to improve the resolution of two-dimensional images, thereby acquiring sharp images. Furthermore, with the laser scanning microscope according to this modification, it is possible to achieve the same advantages as in the first modification.

Although the embodiments of the present invention have been described in detail with reference to the drawings, the specific configuration is not limited to the embodiments, and design modifications or the like not departing from the spirit of the present invention are encompassed.

For example, although the DMD 7 selectively reflect the laser light L in the embodiments, alternatively, the laser light L may be selectively transmitted.

Furthermore, although the DMD 7 including a plurality of movable micromirrors is used as a microelement array as an example in the above description, instead of the DMD 7, a liquid crystal array including a plurality of liquid crystal elements may be used.

Furthermore, although four spots of light of the laser light L enter each of the channels of the photodetector 17 in the embodiments, alternatively, three or less or five or more spots of light may be made to enter each of the channels.

Furthermore, although the stage 20 is moved in the direction perpendicular to the array direction of spots of light of the laser light L in the embodiments, the moving direction need not necessarily be the perpendicular direction, and the stage 20 may be moved in a direction inclined relative to the array direction.

EXPLANATION OF REFERENCE

L: Laser light
F: Fluorescence
1: Laser light source
2: Irradiation optical system
3: Line-focus optical system
4: Detection optical system
5: Excitation dichroic mirror
6: Controller
7: DMD (microelement array)
7a, 7b, 7c, 7d, 7e, 7f, 7g, 7h: Movable micromirrors (microelements)
17: Photodetector
18: Cylindrical lenses
19: Sample
20: Stage
100, 200: Laser scanning microscopes

What is claimed is:

1. A laser scanning microscope comprising:
a stage that moves a sample placeable thereon;
a laser light source that emits laser light;
a line-focus optical system that focuses the laser light from the laser light source into a line shape;
a photodetector comprising a plurality of channels that detect light from the sample and that are arrayed in one column;
a microelement array having a first plurality of microelements that are arrayed in a lengthwise direction of the line shape of the laser light and that reflect or transmit the laser light focused into the line shape by the line-focus optical system; and
an irradiation optical system that irradiates the sample with the laser light reflected or transmitted by the microelement array;
wherein the photodetector is disposed at a position conjugate with the microelement array and a second plurality of microelements of the microelement array are allocated to each of the plurality of channels of the photodetector such that spots of light from each of the second plurality of microelements allocated to a given channel enter said given channel,
wherein the microelement array is driven so that the laser light is reflected or transmitted simultaneously by a third plurality of microelements disposed at intervals on one straight line, so that one of the second plurality of microelements allocated to said given channel reflects or transmits the light to said given channel and the third plurality of microelements reflect or transmit the light respectively to the plurality of channels simultaneously, and so that the third plurality of microelements that reflect or transmit the laser light are switched sequentially, wherein the stage moves the sample in a direction crossing an array direction of a plurality of light spots formed on the sample to obtain a two-dimensional scan image of the sample, wherein the plurality of channels of the photodetector are arrayed in said one column at a pitch greater than a pitch of the first plurality of microelements of the microelement array, and wherein the laser scanning microscope further comprises a controller that drives the microelement array.

2. The laser scanning microscope according to claim 1, further comprising a plurality of cylindrical lenses that focus the light from the sample into the plurality of channels of the photodetector respectively.

3. The laser scanning microscope according to claim 1, further comprising a sensitivity adjusting unit which adjusts respective sensitivities of the plurality of channels of the photodetector.

4. The laser scanning microscope according to claim 1, wherein the stage is linearly driven continuously at a constant velocity, and wherein the controller sequentially switches the third plurality of microelements that reflect or transmit the light to enter the respective plurality of channels at a predetermined cycle in a direction inclined relative to the lengthwise direction.

5. The laser scanning microscope according to claim 4, wherein, of the third plurality of microelements that are disposed at intervals on one straight line and that reflect or transmit the laser light simultaneously, mutually adjacent microelements are disposed on columns adjacent to each other in a direction perpendicular to the lengthwise direction.

* * * * *